US009956994B2

(12) United States Patent
Kageyama et al.

(10) Patent No.: US 9,956,994 B2
(45) Date of Patent: May 1, 2018

(54) LOWER VEHICLE-BODY STRUCTURE OF AUTOMOTIVE VEHICLE

(71) Applicant: MAZDA MOTOR CORPORATION, Hiroshima (JP)

(72) Inventors: Kazuhiro Kageyama, Hiroshima (JP); Junichi Tanaka, Hiroshima (JP)

(73) Assignee: MAZDA MOTOR CORPORATION, Hiroshima (JP)

( * ) Notice: Subject to any disclaimer, the term of this patent is extended or adjusted under 35 U.S.C. 154(b) by 0 days. days.

(21) Appl. No.: 15/598,381

(22) Filed: May 18, 2017

(65) Prior Publication Data
US 2018/0022389 A1    Jan. 25, 2018

(30) Foreign Application Priority Data

Jul. 22, 2016   (JP) .................................. 2016-144735

(51) Int. Cl.
| | | |
|---|---|---|
| B62D 21/15 | (2006.01) |
| B62D 25/20 | (2006.01) |
| B60R 16/04 | (2006.01) |
| B62D 21/16 | (2006.01) |
| B60K 13/04 | (2006.01) |
| B60K 1/04 | (2006.01) |

(52) U.S. Cl.
CPC ............ B62D 21/157 (2013.01); B60R 16/04 (2013.01); B62D 25/20 (2013.01); *B60K 1/04* (2013.01); *B60K 13/04* (2013.01); *B60K 2001/0438* (2013.01); *B60Y 2306/01* (2013.01); *B62D 21/16* (2013.01)

(58) Field of Classification Search
CPC ........ B62D 21/157; B62D 25/20; B60R 16/04
USPC .................. 296/187.08, 193.07, 204, 187.12
See application file for complete search history.

(56) References Cited

U.S. PATENT DOCUMENTS

| | | | | |
|---|---|---|---|---|
| 9,616,939 B2 * | 4/2017 | Natsume | ............ | B62D 25/2036 |
| 2008/0007089 A1 * | 1/2008 | Bachmann | ........... | B62D 21/157 |
| | | | | 296/187.08 |
| 2010/0187864 A1 * | 7/2010 | Tsuchida | ................ | B62D 25/20 |
| | | | | 296/193.07 |
| 2015/0107921 A1 | 4/2015 | Naruke | | |

FOREIGN PATENT DOCUMENTS

JP              09-272400        10/1997

* cited by examiner

*Primary Examiner* — Joseph D. Pape
(74) *Attorney, Agent, or Firm* — Studebaker & Brackett PC

(57) ABSTRACT

An auxiliary device is provided in a space below a portion of a floor panel which is positioned between a floor frame and a tunnel side member which extend in a longitudinal direction, members which extend in a vehicle width direction and straddle the floor frame which is positioned on the side of the auxiliary device and a tunnel side member which is positioned on the opposite side to the auxiliary device, and a yield strength of the vehicle width direction of tunnel corresponding portions, in a width direction, of the members which correspond to a tunnel portion is set to be lower than that of auxiliary-device corresponding portions, in the width direction, of the members which correspond to the auxiliary device.

8 Claims, 8 Drawing Sheets

LOWER VEHICLE-BODY STRUCTURE OF AUTOMOTIVE VEHICLE

BACKGROUND OF THE INVENTION

The present invention relates to a lower vehicle-body structure of an automotive vehicle in which an auxiliary device, such as a battery, is provided below a floor panel.

US Patent Application Publication No. 2015/0107921 A1 and Japanese Patent Laid-Open publication No. H09-272400 are known as the structure in which the auxiliary device, such as the battery, is provided below the floor panel. The first patent document discloses the structure in which a battery module as the auxiliary device is provided below the floor panel in an area which is enclosed by a floor flame and a tunnel frame (tunnel side member), which are respectively provided to extend in a longitudinal direction as a vehicle-body rigidity member at each side of right-and-left both sides of the floor panel, and front-and-rear seat cross members, which are respectively provided to extend in a vehicle width direction as the vehicle-body rigidity member.

That is, the battery module disclosed in the above-described first patent document is protected by being provided at the floor panel such that it is enclosed by the above-described vehicle-body rigidity members in a vehicle bottom view.

In the structure disclosed in the first patent document, however, since no vehicle-body rigidity member extending in the vehicle width direction is provided at a portion which corresponds to the battery module in the vehicle bottom view, such as a portion located below the battery module, there was still room for improvement in protection of the battery module against a vehicle side collision (side face collision) or the like.

The second patent document discloses the structure in which plural batteries as the auxiliary device are provided below the floor panel to extend in the vehicle width direction, a storage box which stores the batteries therein is attached so as to straddle a fixation portion (a tunnel portion), this battery storage box is composed of a roughly rectangular-shaped bottom portion which covers the batteries from below and a frame portion which is configured to rise upward from four sides of this bottom portion, and a whole part of the batteries provided below the floor panel are covered with the battery storage box from outside.

In the structure disclosed in the second patent document, however, while the protection performance of the batteries is improved because the batteries are protected with the hard storage box, there was room for improvement in achieving a light weight of a vehicle body.

SUMMARY OF THE INVENTION

Accordingly, an object of the present invention is to provide a lower vehicle-body 3 structure of an automotive vehicle which can properly protect the auxiliary device from the severe vehicle side collision, such as a pole collision, without accompanying an improper weight increase of the vehicle.

The present invention is a lower vehicle-body structure of an automotive vehicle, comprising a floor panel having a tunnel portion which extends in a longitudinal direction at a center, in a vehicle width direction, of the vehicle, a pair of right-and-left floor frames provided on a lower face of the floor panel to interpose the tunnel portion therebetween, and a pair of right-and-left tunnel side members extending along the tunnel portion at respective positions which are located on an outward side, in the vehicle width direction, of the tunnel portion and on an inward side, in the vehicle width direction, of the floor frames, wherein an auxiliary device is provided below a portion of said floor panel which is positioned between one of said floor frames and one of said tunnel side members, a member which extends in the vehicle width direction and straddles said one of the floor frames and the other tunnel side member which is opposite to said one of the tunnel side members is attached, and a yield strength of the vehicle width direction of a tunnel corresponding portion, in a width direction, of said member which corresponds to the tunnel portion is set to be lower than that of an auxiliary-device corresponding portion, in the width direction, of said member which corresponds to the auxiliary device.

According to the present invention, a vehicle-side-collision load can be directly transmitted to the opposite-side tunnel side member by way of the above-described member and also the tunnel portion can be deformed properly for load absorption, thereby preventing the auxiliary device from being deformed.

In an embodiment of the present invention, the member is configured such that the tunnel corresponding portion and the auxiliary-device corresponding portion are integrated, and the auxiliary-device corresponding portion has a greater width, in the longitudinal direction, than the tunnel corresponding portion.

According to this embodiment, the vehicle height can be prevented from being improperly low and also the productivity of the above-described member and the covering performance of the auxiliary device can be improved.

In another embodiment of the present invention, the tunnel corresponding portion of the member has a constricted portion which is configured such that an inward side, in the vehicle width direction, thereof has a narrower width, in the longitudinal direction, than an outward side, in the vehicle width direction, thereof, the auxiliary-device corresponding portion of the member is configured to substantially linearly extend along the vehicle width direction, and the member is attached such that the auxiliary-device corresponding portion is offset toward the constricted portion of the tunnel corresponding portion in the longitudinal direction.

According to this embodiment, increasing of the amount of load absorption by the load absorption deformation of the tunnel portion and reinforcing of the vehicle body can be compatibly attained at a high level.

In another embodiment of the present invention, the auxiliary device is arranged on either a right side or a left side of the tunnel portion, and an end portion of the member is connected to the other tunnel side member.

According to this embodiment, the vehicle-side-collision load can be prevented from being transmitted to an auxiliary-device arrangement portion from a side which is opposite relatively to the tunnel portion, in the vehicle width direction, to a side having the auxiliary-device arrangement portion.

Other features, aspects, and advantages of the present invention will become apparent from the following description which refers to the accompanying drawings.

DETAILED DESCRIPTION OF THE INVENTION

Figure 1:
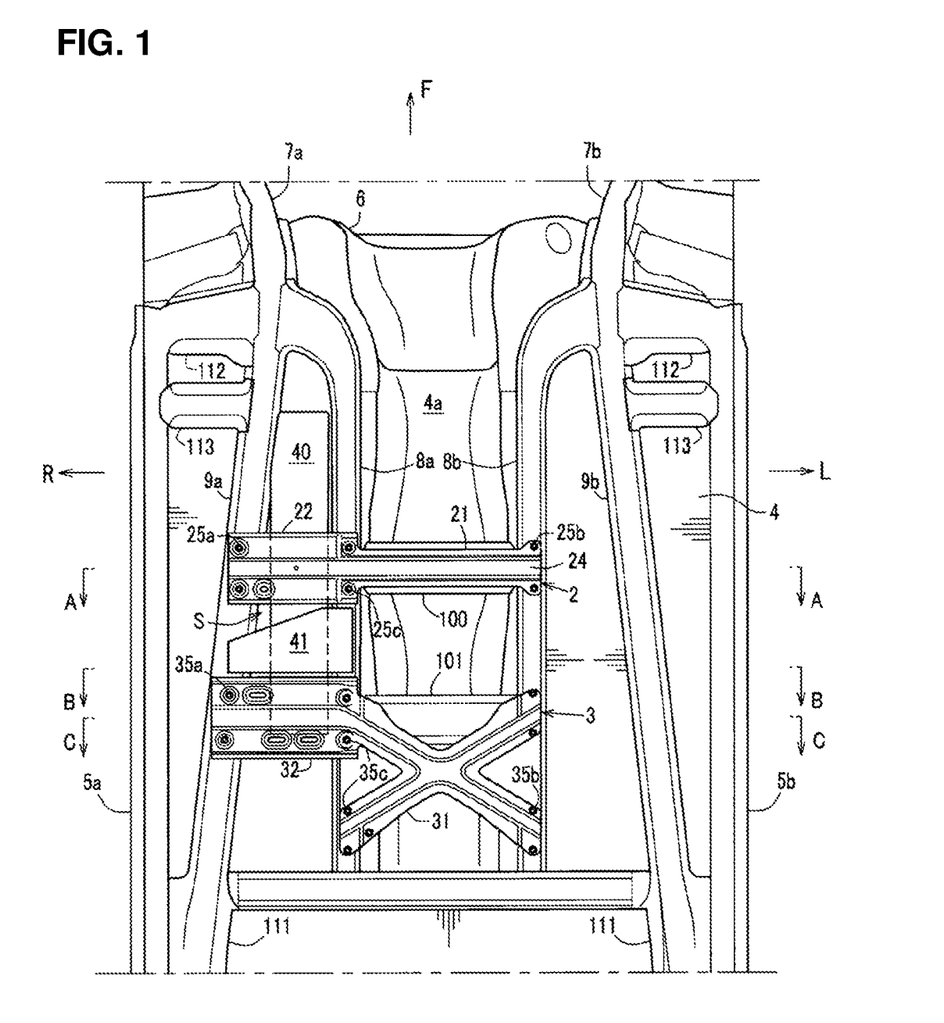
FIG. 1 is a bottom view of a lower vehicle-body structure of an automotive vehicle of a present embodiment.
Figure 4:
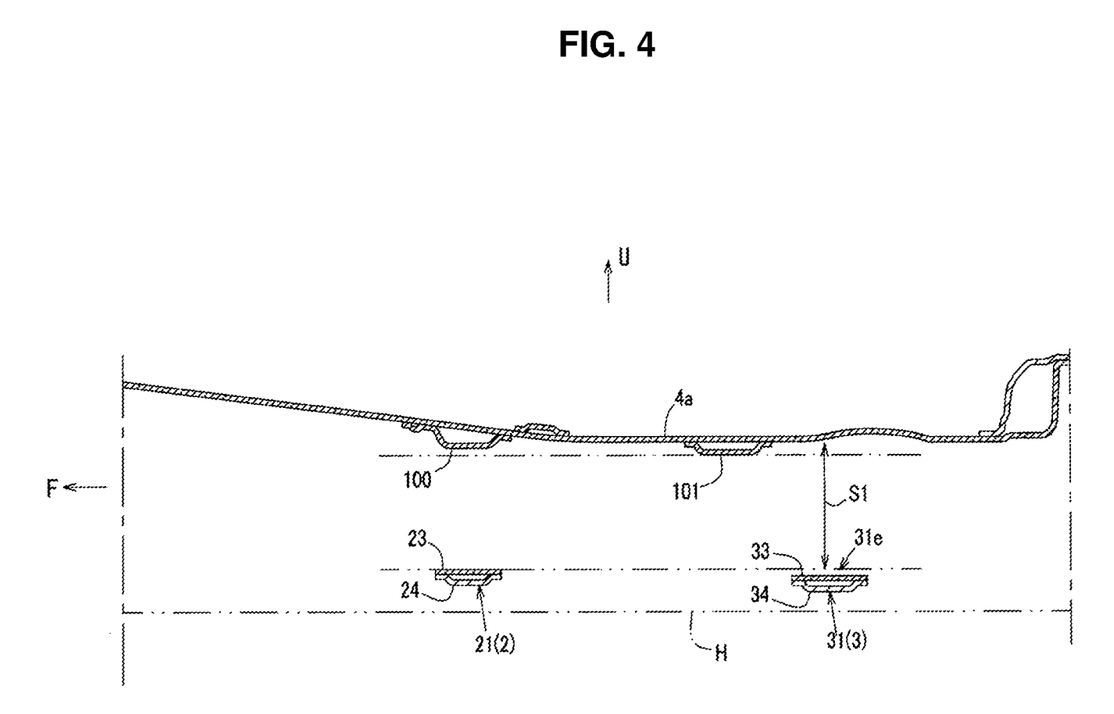
FIG. 4 is a longitudinal sectional view showing a major part of a central portion, in a width direction, of a tunnel portion.
Figure 5A:
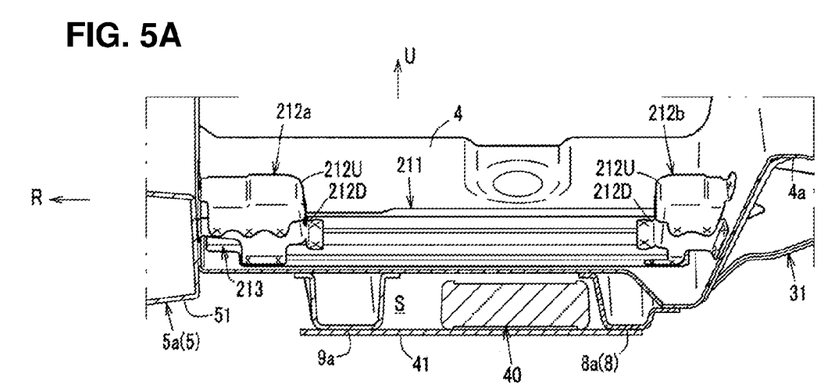
FIGS. 5A and 5B are explanatory diagrams of structures of a rear underfloor member and a rear cross member.
Figure 5B:
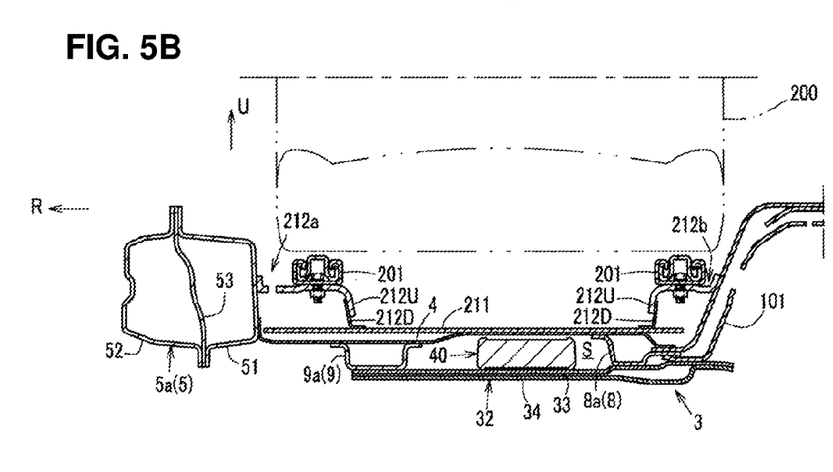
Figures 6A, 6B:
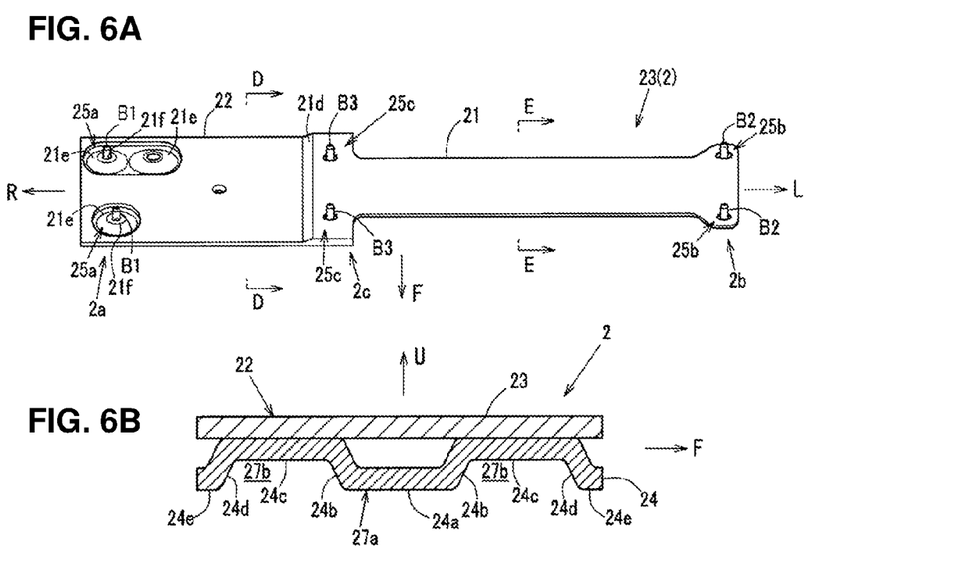
FIGS. 6A, 6B and 6C are explanatory diagrams of a structure of a front underfloor member.
Figure 6C:
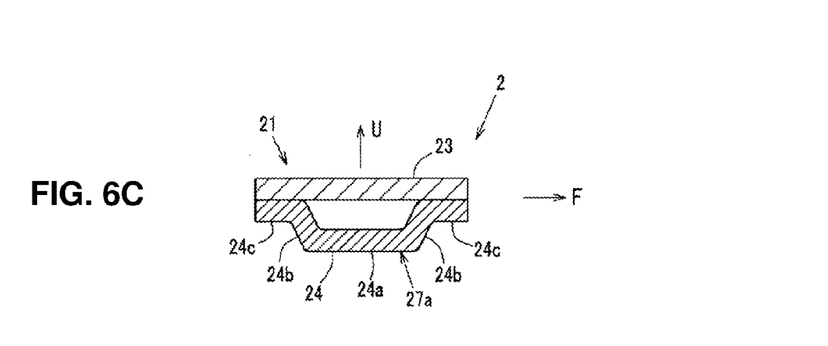
Figure 7:
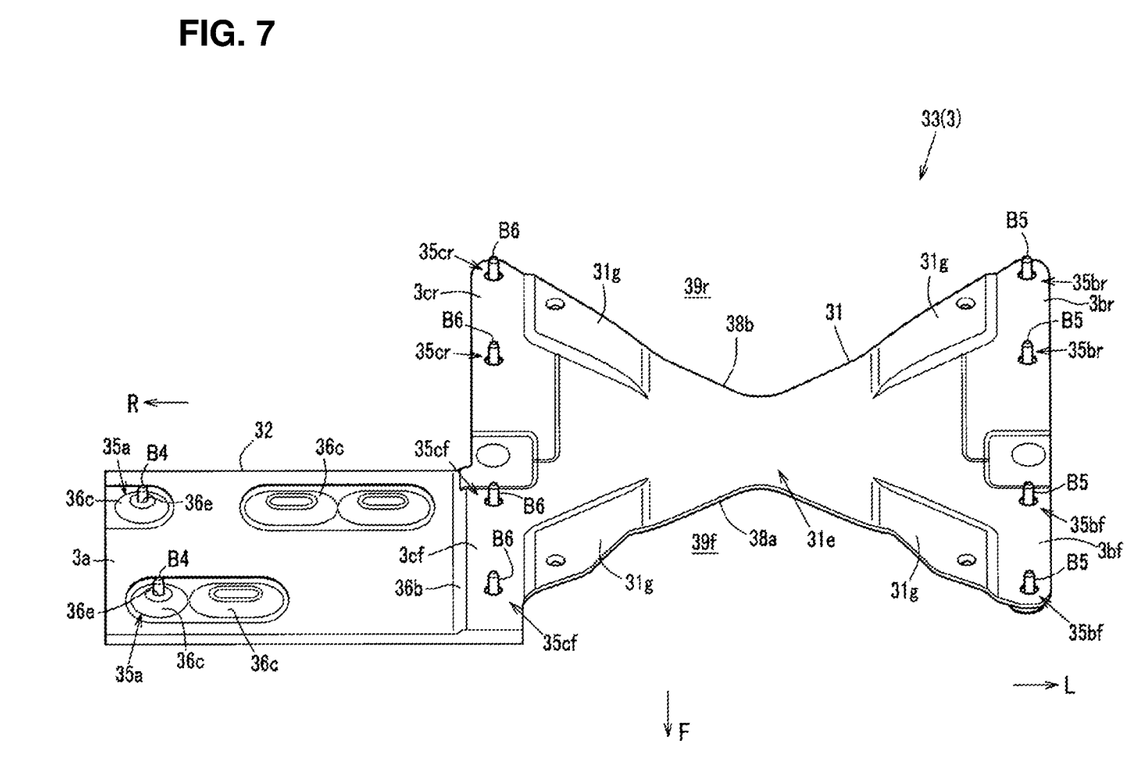
FIG. 7 is an explanatory diagram of the structure of the rear underfloor member.
Figure 8A:
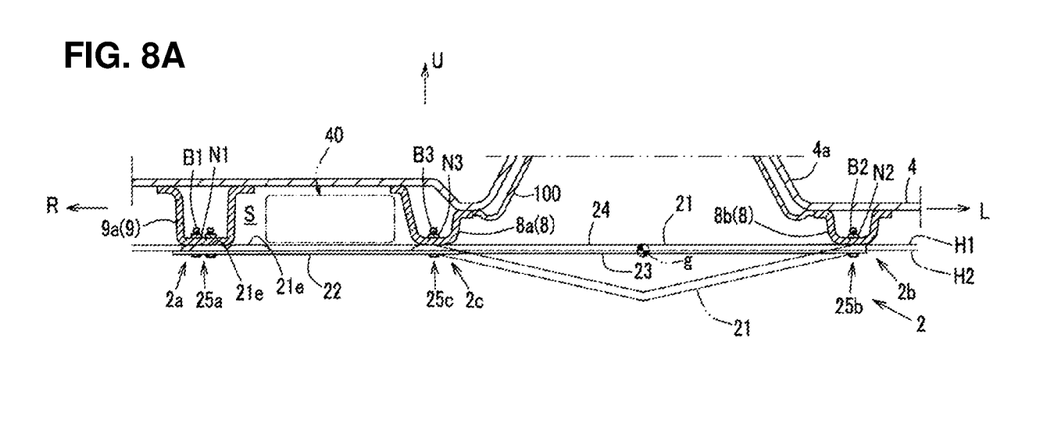
FIGS. 8A and 8B are explanatory diagrams of operations of the front and rear underfloor members in a vehicle side collision.
Figure 8B:
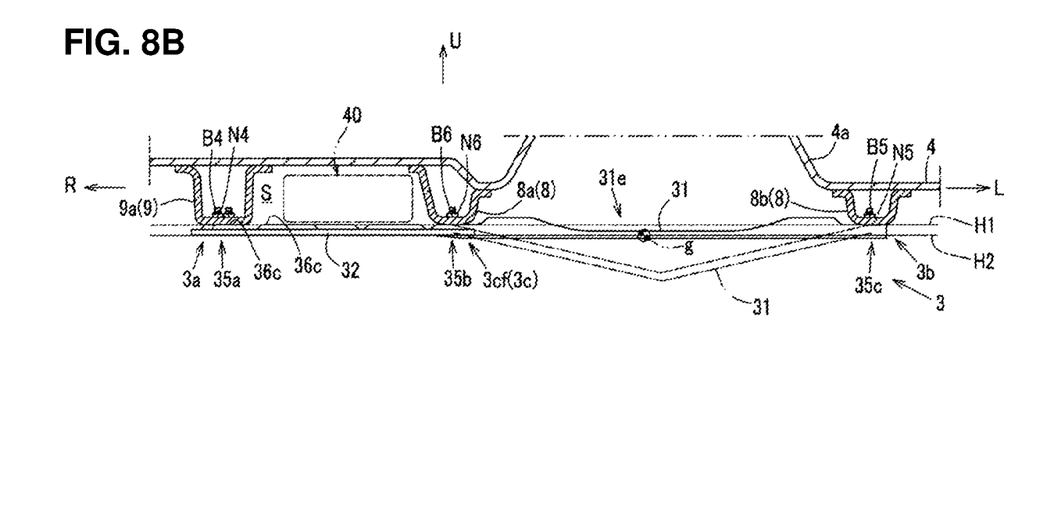

Hereafter, an embodiment of the present invention will be described specifically referring to the accompanying drawings. FIG. 1 is a bottom view of a lower vehicle-body structure of an automotive vehicle of the present embodiment, FIG. 2 is an enlarged view of a major part of FIG. 1, FIG. 3 is a perspective sectional view taken along line A-A of a major part of FIG. 1, FIG. 4 is a longitudinal sectional view showing a major part of a central portion, in a width direction, of a tunnel portion, FIG. 5A is a perspective sectional view taken along line B-B of a major part of FIG. 1, when viewed from obliquely above, FIG. 5B is a perspective sectional view taken along line C-C of a major part of FIG. 1, FIG. 6A is a perspective view of an upper panel of a front underfloor member, when viewed from obliquely forward and upward sides, FIG. 6B is an enlarged sectional view of the front underfloor member, taken along line D-D of FIG. 6A, FIG. 6C is an enlarged sectional view of the front underfloor member, taken along line E-E of FIG. 6A, FIG. 7 is a perspective view of an upper panel of a rear underfloor member, when viewed from obliquely forward and upward sides, FIG. 8A is an explanatory diagram of an operation of the front underfloor member when a large load is inputted to the front underfloor member from a vehicle right side in a vehicle side (side face) collision, and FIG. 8B is an explanatory diagram of an operation of the rear underfloor member when the large load is inputted to the rear underfloor member from the vehicle right side in the vehicle side collision.

In the figures, an arrow F shows a vehicle forward side, an arrow R shows a vehicle rightward side, an arrow L shows a vehicle leftward side, and an arrow U shows a vehicle upward side. Further, the forward, rearward, leftward, rightward, upward and downward sides which will be used in describing the front and rear underfloor members below mean the respective directional sides in a state where the front and rear underfloor members are installed to the vehicle, which are the same as the forward, rearward, leftward, rightward, upward and downward sides of the vehicle, respectively.

Figure 2:
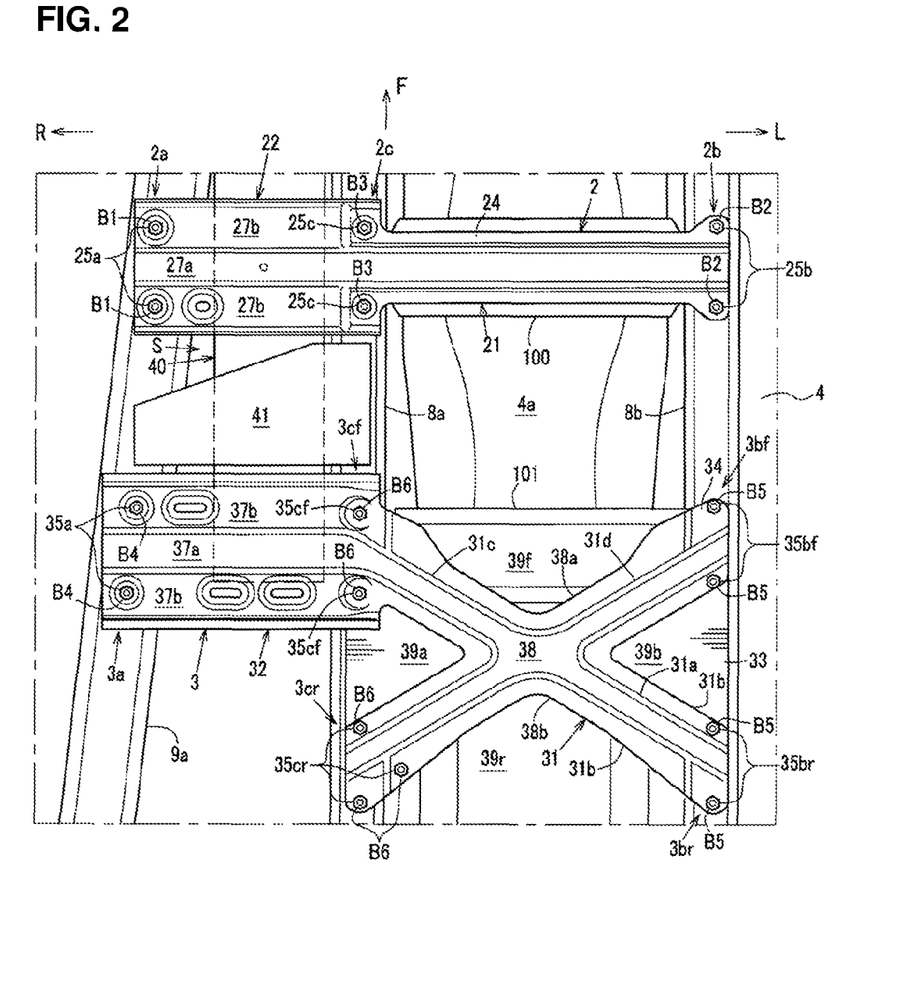
FIG. 2 is an enlarged view of a major part of FIG. 1.
Figure 3:
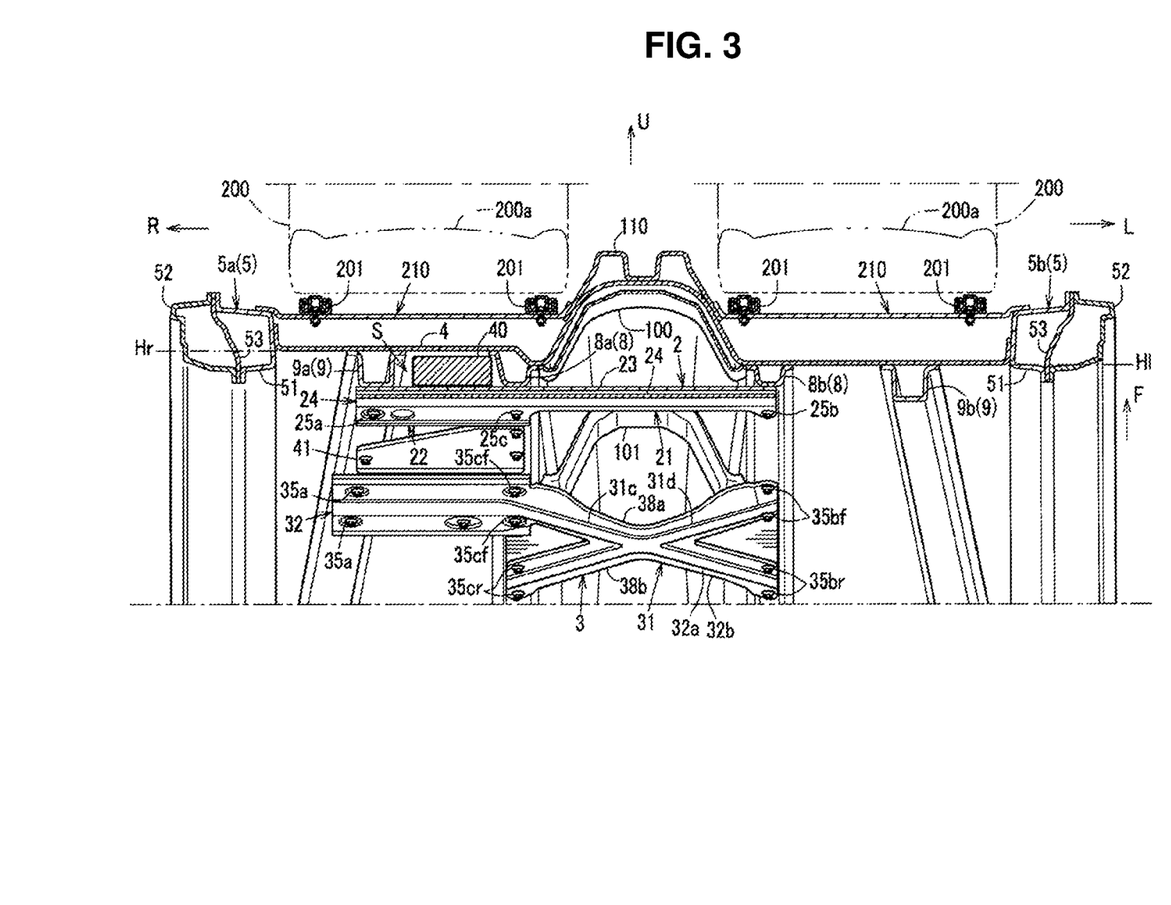
FIG. 3 is a perspective sectional view taken along line A-A of a major part of FIG. 1.

As shown in FIGS. 1-3, the lower vehicle-body structure of the automotive vehicle of the present embodiment comprises a floor panel 4, a pair of right-and-left side sills 5 (5a, 5b), a dash panel 6, a pair of right-and-left front side frames 7 (7a, 7b), a pair of right-and-left tunnel side members 8 (8a, 8b), a pair of right-and-left floor frames 9 (9a, 9b) (B frame), front and rear underfloor members 2, 3 and others.

As shown in FIG. 3, the floor panel 4, which forms a floor face, is configured such that a tunnel portion 4a which extends in the vehicle longitudinal direction at a central portion, in the vehicle width direction, of the floor panel 4 protrudes upward (a cabin side) in a convex shape.

As shown in FIG. 3, the pair of right-and-left side sills 5a, 5b extend in the vehicle longitudinal direction, and the floor panel 4 is joined to these side sills 5a, 5b at its right-and-left end portions. Each of the side sills 5a, 5b comprises an inner panel 51 and an outer panel 52 which have a hat-shaped cross section, respectively, and a closed cross section extending in the vehicle longitudinal direction is formed by these inner panel 51 and outer panel 52. The side sill 5 further comprises a reinforcement 53 which is positioned inside the closed cross section between the inner panel 51 and the outer panel 52.

Further, an outward end, in the vehicle width direction, of the floor panel 4 is joined to a lower portion of an inward side, in the vehicle width direction, of the inner panel 51.

The dash panel 6 partitions the cabin from an engine room which is provided at a vehicle front side, and a front end portion of the floor panel 4 is joined to a lower end portion of the dash panel 6 which extends obliquely rearward and downward.

The pair of right-and-left front side frames 7a, 7b extend in the vehicle longitudinal direction, and their rear portions are joined to a lower face of the floor panel 4, so that a closed cross section is formed by a rear portion of the front side frame 7 and a lower face of the floor panel 4. Further, a forward-side portion of the rear portion of the front side frame 7 which is positioned in front of its joint portion to the floor panel 4 is joined to a front face portion of the dash panel 6 (see FIG. 1).

The pair of right-and-left front side frames 8a, 8b (tunnel lower frames) are configured such that their front portions extend obliquely inward and rearward from respective inward-side faces of the rear end portions of the front side frames 7a, 7b, respective portions which are positioned in back of the above-described obliquely-extending portions are provided adjacently to both sides, in the vehicle width direction, of the tunnel portion 4a and configured to be respective convex hat-shaped portions which extend in the vehicle longitudinal direction roughly linearly and protrude downward, and they are joined to the lower portion of the dash panel 6 and the lower face of the floor panel 4 so as to form respective closed cross sections extending in the longitudinal direction. In FIG. 3, reference character 110 denotes a tunnel reinforcing member which is configured to have a hat-shaped cross section which protrudes upward in a convex shape and also form a closed cross section together with an upper face of the tunnel portion 4a.

Further, as shown in FIGS. 1 and 2, a front tunnel cross member 100 and a rear tunnel cross member 101 which reinforce the tunnel portion 4a are arranged at front and rear sides of a central portion, in the longitudinal direction, of the tunnel portion 4a. These front and rear tunnel cross members 100, 101 are provided to straddle the tunnel portion 4a and protrude upward along an inner face of the tunnel portion 4a, and joined to the inner face (lower face) of the tunnel portion 4a as shown in FIG. 4.

Herein, the tunnel portion 4a is configured such that its level becomes gradually lower toward its rear side as shown in FIG. 4. That is, the tunnel portion 4a is configured such that an inner space formed thereby becomes narrower toward its rear side. In this inner space formed by the tunnel portion 4a, a propeller shaft, not illustrated, which extends from a vehicle forward side to a vehicle rearward side, an exhaust pipe as an engine exhaust-system parts, and others are arranged in the longitudinal direction.

The pair of right-and-left floor frames 9a, 9b are configured to be respective convex hat-shaped portions which extend rearward from rear ends of the front side frames 7a, 7b and protrude downward on the lower face of the floor panel 4, and they are joined to the lower portion of the dash panel 6 and the lower face of the floor panel 4 so as to form respective closed cross sections. These floor frames 9a, 9b respectively extend obliquely outward and rearward in each area between the side sill 5 and the tunnel side member 8.

Herein, rear ends of the floor frames 9a, 9b are joined to respective inward faces of the rear portions of the side sills 5 and respective front ends of the rear side frames 111 which extend rearward (see FIG. 1).

In FIG. 1, reference character 112 denotes a pair of right-and-left torque boxes as a reinforcing member, and cross members 113 which interconnects respective front portions of the side sills 5 and respective front portions of the front frames 9 are arranged on the lower face of the floor panel 4 in back of the torque box 112.

Further, as shown in FIG. 3, a front seat 200 (front seat) is provided on a front portion of the floor panel 41, which is supported via a seat rail 201 so as to slide longitudinally.

The front seat 200 comprises a pair of right-and-left seats (a driver's seat and a passenger seat (assistant driver's seat)) which are arranged side by side in the vehicle width direction. Herein, a rear seat is provided on a rear portion of the floor panel 41 which is positioned in back of the front seat 200, which is not illustrated in the present embodiment.

As shown in FIGS. 3 and 5B, the seat rail 201 comprises a pair of right-and-left rails which are positioned on both sides of each front seat 200, which are supported at a front cross member 210 and a rear cross member 211, extending in the longitudinal direction.

The front cross member 210 and the rear cross member 211 are provided, on each side of the vehicle right-and-left sides, to extend in the vehicle width direction at respective positions on the upper face of the floor panel 4 which correspond to front and rear sides of the front seat 200, and respective outward ends, in the vehicle width direction, of these cross members 210, 211 are connected to the side sill 5 and respective inward ends, in the vehicle width direction, of these cross members 210, 211 are connected to the tunnel side member 8, thereby forming respective closed cross sections between the upper face of the floor panel 4 and them. The front cross member 210 is arranged at a position, in the longitudinal direction, of the floor panel 4 which roughly corresponds to a front underfloor member 2 which is provided on the lower face of the floor panel 4, which will be described later, and the rear cross member 211 is arranged at a position, in the longitudinal direction, of the floor panel 4 which roughly corresponds to a rear underfloor member 3 which is provided on the lower face of the floor panel 4, which will be described later. A cabin-inside space for the vehicle side collision is secured by these cross members 210, 211 and these underfloor members 2, 3.

Specifically, a front end of the seat rail 201 is, as shown in FIG. 3, attached such that it is directly supported at the front cross member 210, whereas a rear portion of the seat rail 201 is, as shown in FIGS. 5A and 5B, attached to the rear cross member 211 via a seat support bracket 212. The seat support bracket 212 is provided at both end portions, in the vehicle width direction, of the rear cross member 211. Herein, illustration of the seat rail 201 is omitted in FIG. 5A.

As shown in FIGS. 1-3, 5A and 5B, according to the above-described lower vehicle-body structure, a power storage unit 40 as an auxiliary device is provided below the floor panel 4 on one side, in the vehicle width direction, of the vehicle, specifically in the present embodiment, provided in an underfloor space between the right floor flame 9a and the right tunnel side member 8a. The power storage unit 40 is configured such that its casing is properly attached to the lower face of the floor panel 4 or the front-and-rear underfloor members 2, 3 or the like by means of bolts or the like, not illustrated.

Herein, any other auxiliary device, such as an electric device, for example, a fuel tank, an exhaust gas purifier (a so-called SCR), a vehicle control unit, a noncontact charge unit, or a drive recorder, is applicable as the above-described auxiliary device in place of the power storage unit 40. Meanwhile, as shown in FIG. 1, no auxiliary device, such as the power storage device, is provided below the floor panel 4 on the other side, in the vehicle width direction, of the vehicle, i.e., on the left side of the vehicle in the present embodiment.

The power storage unit 40 is arranged in a power-storage-unit arrangement space S between the left floor frame 9a and the tunnel side member 8a, and configured in a roughly-rectangular shape, in the bottom view, such that its front end roughly corresponds to a position, in the longitudinal direction, of the cross member 113 (see FIG. 1) and its rear end roughly corresponds to a position, in the longitudinal direction, of the rear tunnel cross member 101 (see FIGS. 1, 5A and 5B).

Herein, by arranging the power storage unit 40 between the floor frame 9a and the tunnel side member 8a on the right side, in the vehicle width direction, of the vehicle, the space between the side sill 5a and the floor frame 9a is deformed first when the vehicle has a side collision from the vehicle right side, thereby absorbing the vehicle-side-collision load. Thus, the power-storage-unit arrangement space S can be protected so as not to be deformed by the vehicle-side-collision load.

As shown in FIGS. 1 and 3, a gusset 41 which covers the power storage unit 40 from below is provided below the floor panel 4 and at a middle position, in the longitudinal direction, of the power storage unit 40. This gusset 41 is configured to extend in the vehicle width direction, and connected to the right floor frame 9a and the right tunnel side member 8a.

Further, the underfloor members 2, 3 which respectively extend in the vehicle width direction and cover the power storage unit 40 from below are attached to front and rear sides, in the longitudinal direction, of the power storage unit 40 relatively to the gusset 41 below the floor panel 4. The underfloor members 2, 3 comprise the front underfloor member 2 and the rear underfloor member 3 which is arranged in back of the front underfloor member 2.

While the gusset 41 is configured to be laid between the right floor frame 9a and the right tunnel side member 8a, each of these underfloor members 2, 3 is configured to be laid between the right floor frame 9a where the power storage unit 40 is provided and the left tunnel side member 9b which is provided on the opposite side to arrangement of the power storage unit 40.

That is, the front and rear underfloor members 2, 3 are respectively provided from the right side of the tunnel portion 4a where the power storage unit 40 is provided to the opposite-side (left-side) tunnel side member 8b, and respective left end portions 2b, 3b of the underfloor members 2, 3 are connected to the left tunnel side member 8b. Herein, the respective underfloor members 2, 3 are configured not to extend leftward (outward in the vehicle width direction) beyond the left tunnel side member 8b.

The front and rear underfloor members 2, 3 respectively extend linearly in the vehicle width direction, and respectively comprise front and rear tunnel corresponding portions 21, 31 which extend so as to mainly straddle the tunnel portion 4a in the vehicle width direction and front and rear auxiliary-device corresponding portions 22, 32 which extend so as to mainly straddle the power storage unit 40 as the auxiliary device, which are integrated.

The front underfloor member 2 is configured such that the front tunnel corresponding portion 21 is narrower, in the longitudinal direction, than the front auxiliary-device corresponding portion 22. Thereby, a yield strength of the vehicle width direction of the front tunnel corresponding portion 21 is set to be lower than that of the front auxiliary-device corresponding portion 22. Herein, the above-described yield strength of the vehicle width direction means the yield strength against the vehicle-side-collision load. In other words, since the front underfloor member 2 is configured such that the auxiliary-device corresponding portion 22 is wider, in the longitudinal direction, than the front tunnel corresponding portion 21, the covering performance (chipping-proof performance) that chipping (flying stones) for the power storage unit 40 is properly prevented is improved.

As shown in FIGS. 3, 4, 6A, 6B and 6C, the front underfloor member 2 comprises an upper panel 23 and a lower panel 24 which are provided to face each other vertically, and the front auxiliary-device corresponding portion 22 is arranged so as to cover a roughly central portion, in the longitudinal direction, of the power storage unit 40 from below and the front tunnel corresponding portion 21 is arranged so as to overlap, in the longitudinal direction, the front tunnel cross member 100 at the tunnel portion 4a (see FIGS. 1 and 2). As shown in FIGS. 2, 3, 6A, 6B and 6C, the upper panel 23 and the lower panel 24 of the front underfloor member 2 are configured such that they have similar shapes and sizes in the bottom view.

Subsequently, attachments of the front underfloor member 2 to the respective vehicle-body side frames 9a, 8a, 8b provided below the floor panel 4 will be described referring to FIGS. 2, 6 and 8a. The above-described front underfloor member 2 is configured such that the upper panel 23 and the lower panel 24 are fastened together to a lower face of the right front frame 9a at front and rear positions of its right end by using bolts B1 and nuts N1 or the like, thereby forming a right-end fastening portion 25a.

The above-described front underfloor member 2 is configured such that the upper panel 23 and the lower panel 24 are fastened together to a lower face of the left tunnel side member 8b at front and rear positions of its left end portion 2b by using bolts B2 and nuts N2 or the like, thereby forming a left-end fastening portion 25b.

Further, the above-described front underfloor member 2 is configured such that the upper panel 23 and the lower panel 24 are fastened together to a lower face of the right tunnel side member 8a at a middle position, in the vehicle width direction, thereof which corresponds to a position where the front underfloor member 2 straddles the right tunnel side member 8a by using bolts B3 and nuts N3 or the like, thereby forming a middle fastening portion 25c.

Thus, the right floor frame 9a and the right tunnel side member 8a are connected via the front auxiliary-device corresponding portion 22 of the front underfloor member 2, and the pair of right-and-left tunnel side members 8a, 8b are connected via the front tunnel corresponding portion 21. Herein, the front underfloor member 2 is configured not to extend leftward (outward in the vehicle width direction) beyond the left tunnel side member 8b (see FIGS. 1-3).

In the present embodiment, as shown in FIG. 2, a wide portion, in the longitudinal direction, of the front underfloor member 2, including not only a portion, in the vehicle width direction, thereof which corresponds to the power storage unit 40 but the right end portion 2a and the middle portion 2c (the connection portion 2c of the front tunnel corresponding portion 21 and the front auxiliary-device corresponding portion 22), is set to be the front auxiliary-device corresponding portion 22, and another portion of the front underfloor member 2, including not only a portion, in the vehicle width direction, thereof which corresponds to the tunnel portion 4a but the left end portion 2b and the middle portion 2c of the front underfloor member 2, is set to be the front tunnel corresponding portion 21.

As shown in FIGS. 2, 6B and 6C, the lower panel 24 of the front underfloor member 2 has a middle convex portion 27a which extends in the vehicle width direction and protrudes downward at a central portion, in a longitudinal direction, thereof over a range from the front auxiliary-device corresponding portion 22 to the front tunnel corresponding portion 21. Further, the lower panel 24 of the front auxiliary-device corresponding portion 22 has a pair of concave portions 27b in front and rear of the middle convex portion 27a, so that the lower panel 24 of the front auxiliary-device corresponding portion 22 is configured to have an uneven-shaped cross section which is perpendicular to the vehicle width direction. Thus, the front auxiliary-device corresponding portion 22 is configured to have a wider width, in the longitudinal direction, than the front tunnel corresponding portion 21.

However, as shown in FIGS. 2 and 6B, front and rear portions of a left end portion 2b of the front tunnel corresponding portion 21 are respectively configured to have a wide width in accordance with its being formed in a flange shape so as to correspond to the left-end fastening portion 25b. Meanwhile, the right end portion 2c of the front tunnel corresponding portion 21, which corresponds to the connection portion 2c of the front tunnel corresponding portion 21 and the front auxiliary-device corresponding portion 22, is configured to have the same width as the front auxiliary-device corresponding portion 22.

That is, a portion of the front tunnel corresponding portion 21 which excludes its right and left both end portions 2b, 2c has a width which is equivalent to or smaller than a distance between the front and rear sides of the right-end fastening portion 25a provided at the right end portion 2a of the front underfloor member 2, a distance between the front and rear sides of the left-end fastening portion 25b provided at the left end portion 2a of the front underfloor member 2, or a distance between the front and rear sides of the middle fastening portion 25c provided at the middle portion 2c of the front underfloor member 2.

As shown in FIG. 6B, the lower panel 24 of the front auxiliary-device corresponding portion 22 comprises a middle lower wall portion 24a which is horizontally positioned below a middle, in the longitudinal direction, thereof, a pair of inward-side vertical wall portions 24b, 24b which rise from front and rear ends of the middle lower wall portion 24a, a pair of upper wall portions 24c, 24c which horizontally extend outward (forward and rearward) from respective upper ends of the inward-side vertical wall portions 24b, a pair of outward-side vertical wall portions 24d, 24d which lower (i.e., extend downward) from front and rear ends of the upper wall portions 24c, and a pair of outward-side lower wall portions 24e, 24e which extend horizontally outward (forward and rearward) from respective lower ends of the outward-side vertical wall portions 24d, which are integrated.

Upper faces of the pair of upper wall portions 24c, 24c are joined to a lower face of the upper panel 23, the above-described middle convex portion 27a is formed by the middle lower wall portion 24a and the pair of upper wall portions 24b, 24b, and a closed cross section is formed between the middle convex portion 27a and the upper panel 23.

Meanwhile, as shown in FIG. 6C, the lower panel 24 of the front tunnel corresponding portion 21 also has a middle convex portion 27a which is formed by the middle lower wall portion 24a and the pair of inward-side vertical wall portions 24b, 24b, and a closed cross section is formed between the middle convex portion 27a and the upper panel 23. Herein, the upper wall portion 24c of the front tunnel corresponding portion 21 is configured to be one half of or shorter than the length of the upper wall portion 24c of the front auxiliary-device corresponding portion 22.

Herein, as shown in FIGS. 6A and 8A, the lower panel 24 and the upper panel 23 of the front underfloor member 2 are configured such that the front tunnel corresponding portion 21 is arranged to be upward offset from the front auxiliary-device corresponding portion 22 by substantially a plate thickness of the front auxiliary-device corresponding portion 22, including the connection portion 2c to the front auxiliary-device corresponding portion 22, and a step portion 21d is formed at a right end of the connection portion 2c of the front tunnel corresponding portion 21 and the front auxiliary-device corresponding portion 22 (see FIG. 6). Moreover, plural seat portions 21e which protrude substantially up to a level (height) position of the upper face of the front tunnel portion 21 are formed at a portion of the front auxiliary-device corresponding portion 22 which corresponds to at least the right-end fastening portion 25a. Herein, a penetration hole 21f for penetration of the bolt B1 is formed at a central portion of the seat portion 21e which is provided at the right-end fastening portion 25a (see FIG. 6A).

The above-described front underfloor member 2 which has been attached to the respective frames 9a, 8a, 8b positioned below the floor panel 4 as described above from below can be arranged as shown in FIG. 8A such that some portions of the front underfloor member 2 which correspond to at least the right-end fastening portion 25a, the left-end fastening portion 25b, and the middle fastening portion 25c are located at a higher level (height) than the other portion of the front underfloor member 2.

That is, as shown in FIG. 8A, the middle fastening portion 25c and the left-end fastening portion 25b are respectively fastened to the right tunnel side member 8a and the left tunnel member 8b in such a manner that the height (level) H1 of the fastening portions 25c, 25b is higher than the height (level) H2 of a rigidity center g (gravity center) which is located at a central position, in the vehicle width direction, of the front tunnel corresponding portion 21.

Thereby, even if the vehicle-side-collision load which is large enough to deform the front underfloor member 2 itself is inputted to the front underfloor member 2 from the vehicle-body rightward side, the front tunnel corresponding portion 21 which is configured to have the narrow-wide portion so as to be weaker (a yield strength of the vehicle width direction of the front tunnel corresponding portion 21 is lower) than the front auxiliary-device corresponding portion 22 is deformed with priority. Moreover, when the front tunnel corresponding portion 21 is deformed, the front tunnel corresponding portion 21 can be deformed downward securely, so that the deformed front tunnel corresponding portion 21 can be prevented from interfering with an exhaust pipe and others, not illustrated, which are arranged in the tunnel portion 4a.

Specifically, since the middle fastening portion 25c and the left-end fastening portion 25b are fastened to the respective tunnel side members 8a, 8b provided below the floor panel 4 at the relatively high level (H1), compared with the other portion of the front underfloor member 2, the load inputted to the middle fastening portion 25c and the left-end fastening portion 25b from the front auxiliary-device corresponding portion 22 which is arranged at the relatively low level (H2) via the step portion 21d is transmitted, being offset upward. Further, since a load input point of the vehicle-side-collision load inputted to the middle fastening portion 25c and the left-end fastening portion 25b is positioned above the rigidity center g of the front tunnel corresponding portion 21 (H1>H2), the front tunnel portion 4a is compressed inward in the vehicle width direction by the load input to the middle fastening portion 25c and the left-end fastening portion 25b, so that the front tunnel corresponding portion 21 can be deformed downward securely as shown by an imaginary line in FIG. 8A.

Accordingly, it can be prevented that the front tunnel corresponding portion 21 which may be bent upward, for example, comes to interfere with the exhaust pipe and others arranged in the tunnel portion 4a and its deformation is blocked, thereby damaging the load absorption performance.

Subsequently, the above-described rear underfloor member 3 will be described referring to FIG. 2. The rear auxiliary-device corresponding portion 32 of the rear underfloor member 3 has substantially the same longitudinal-directional width as the front auxiliary-device corresponding portion 22 of the front underfloor member 2 and is configured to be linear in the vehicle width direction. Meanwhile, the rear tunnel corresponding portion 31 of the rear underfloor member 3 has a longitudinal-directional narrow portion 38 (a constricted portion 38) which is configured such that a middle part, in the vehicle width direction, of the rear tunnel corresponding portion 31 is narrower than outward portions, in the vehicle width direction, of the rear tunnel corresponding portion 31, and this rear tunnel corresponding portion 31 is configured such that both apexes of right-and-left isosceles triangles are butted against each other at a middle portion, in the vehicle width direction, of the vehicle body, i.e., formed in a so-called butterfly shape.

Thus, the rear tunnel corresponding portion 31 has a front concave apace 39f which is concaved rearward relatively to the vehicle outward side at a middle portion, in the vehicle width direction, of a front-side portion of the rear tunnel corresponding portion 31 and also has a rear concave space 39r which is concaved forward relatively to the vehicle outward side at a middle portion, in the vehicle width direction, of a rear-side portion of the rear tunnel corresponding portion 31.

That is, a front side of the rear tunnel corresponding portion 31 of the rear underfloor member 3 is configured in a constricted shape (concave shape) such that a central portion, in the vehicle width direction, thereof is constricted rearward relatively to the vehicle outward side, so that a front-side constricted portion 38a is formed at a central portion, in the vehicle width direction, of this front side. A rear side of the rear tunnel corresponding portion 31 of the rear underfloor member 3 is configured in another constricted shape (concave shape) such that the central portion, in the vehicle width direction, thereof is constricted forward relatively to the vehicle outward side, so that a rear-side constricted portion 38b is formed at a central portion, in the vehicle width direction, of this rear side.

Moreover, the rear underfloor member 3 is configured such that the rear auxiliary-device corresponding portion 32 is provided to be offset, in the longitudinal direction, toward the front-side constricted portion 38a of the rear tunnel corresponding portion 31, and the rear auxiliary-device corresponding portion 32 is integrally connected to the rear tunnel corresponding portion 31.

That is, since the rear auxiliary-device corresponding portion 32 is arranged in an area where it overlaps, in the longitudinal direction, the front-side constricted portion 38a of the rear tunnel corresponding portion 31, the front concave apace 39f is provided on a left-side extension line of the rear auxiliary-device corresponding portion 32 which is configured to extend linearly in the vehicle width direction. Thereby, the yield strength of the vehicle width direction of the tunnel corresponding portion 31 is set to be lower than that of the rear auxiliary-device corresponding portion 32.

Subsequently, respective specific shapes of the rear auxiliary-device corresponding portion 32 and the rear tunnel corresponding portion 31 will be described. The rear auxiliary-device corresponding portion 32 is configured to have substantially the same cross-section shape as the front auxiliary-device corresponding portion 22 (see FIG. 6A) in the cross section perpendicular to the vehicle width direction. That is, as shown in FIG. 2, the rear auxiliary-device corresponding portion 32 has a middle convex portion 37a which protrudes downward at a central portion, in the vehicle width direction, thereof and a pair of concave portions 37b, 37b in front and rear of the middle convex portion 27a, so that the rear auxiliary-device corresponding portion 32 is configured to have an uneven-shaped cross section which is perpendicular to the vehicle width direction, and a closed cross section which extends in the vehicle width direction is formed between the lower panel 34 and the upper panel 33.

Meanwhile, as shown in FIG. 2, the lower panel 34 of the rear tunnel corresponding portion 32 is formed in a roughly X shape in the bottom view, and comprises an X-shaped convex portion 31a which protrudes downward in the roughly X shape in the bottom view and a flange portion 31b which is formed along an upper edge side of the X-shaped convex portion 31a, which are formed integrally. The X-shaped convex portion 31a is formed in the X shape in the bottom view, which comprises a rightward-forward linear convex portion 31c which linearly extends obliquely rightward and forward relatively to the vehicle width direction and a leftward-forward linear convex portion 31d which linearly extends obliquely leftward and forward relatively to the vehicle width direction. These linear convex portions 31c, 31d cross each other at the narrow portion 38 provided at the central portion of the X-shaped convex portion 31a.

An X-shaped closed cross section is formed inside by the X-shaped convex portion 31a of the lower panel 34 and the upper panel 33 which is configured such that part of this panel 33 which faces the X-shaped convex portion 31a is of a flat shape. Herein, a right-side concave space 39a is formed on the right side of the central portion of the X-shaped convex portion 31a of the lower panel 34, whereas a left-side concave space 39b is formed on the left side of the central portion of the X-shaped convex portion 31a of the lower panel 34.

A left end portion 3cf of the above-described middle convex portion 37a of the rear auxiliary-device corresponding portion 32 and a right end portion 3cf of the rightward-forward linear convex portion 31c of the rear tunnel corresponding portion 31 are connected integrally, and their respective inside closed-cross-section portions extend continuously.

As shown in FIG. 7, the upper panel 33 of the rear tunnel corresponding portion 31 is formed at a portion where it overlaps the right-side concave space 39a and the left-side concave space 39b of the lower panel 34 in the bottom view, in addition to a portion where it overlaps the lower panel 34 in the bottom view, and the upper panel 33 is configured such that both apexes of isosceles triangles which are arranged on right and left sides are butted against each other at its middle portion, i.e., formed in the so-called butterfly shape.

Further, the upper panel 33 includes protrusion portions 31g which protrude upward at four portions which exclude the central portion and both end portions thereof. These protrusion portions 31g are arranged at four positions, in total, which are located in front and back of a left side and a right side of the upper panel 33, respectively. In other words, a central portion of the upper panel 33 is configured to be concaved downward relatively to the four protrusion portions 31g, so that a concave central portion 31e is formed at an upper face of the central portion, in the plan view, of the rear tunnel corresponding portion 31.

Further, as shown in FIG. 2, the rear underfloor member 3 is configured such that the upper panel 33 and the lower panel 34 are arranged so as to face each other in the vertical direction and integrally formed, and the rear auxiliary-device corresponding portion 3 covers a rear portion of the power storage unit 40. Also, the front-side concave space 39f of the rear tunnel corresponding portion 31 is arranged at a position which corresponds to the rear tunnel cross member 101 in the longitudinal direction, that is, a position where a central portion of the X-shaped convex portion 31a is offset rearward from the rear tunnel cross member 101.

As shown in FIGS. 2 and 8B, the above-described rear underfloor member 3 is configured such that the upper panel 33 and the lower panel 34 are fastened together to a lower face of the right floor frame 9a by bolts B4 and nuts N4 or the like at front and rear sides of its right end portion 3a, thereby forming a right-end fastening portion 35a.

The rear underfloor member 3 is configured such that the upper panel 33 and the lower panel 34 are fastened together to a lower face of the left tunnel side member 8 by bolts B5 and nuts N5 or the like at front and rear sides of its left-end fastening portion 3b (3bf, 3b r), thereby forming a left-end fastening portion 35b (35b f, 35b r).

The rear underfloor member 3 is configured such that the upper panel 33 and the lower panel 34 are fastened together to a lower face of the right tunnel side member 8b by bolts B6 and nuts N6 or the like at a middle portion 3c (3cf, 3cr), in the vehicle width direction, thereof where the rear underfloor 3 straddles the right tunnel side member 8, thereby forming a middle fastening portion 35c (35cf, 35cr).

The right-end fastening portion 35a comprises the front-side middle-end fastening portion 35cf which is provided at the connection portion 3cf of the rear auxiliary-device corresponding portion 32 and the rear tunnel corresponding portion 31 and the rear-side middle-end fastening portion 35cr which is provided at the right-rear end portion 3cr of the rear tunnel corresponding portion 31. Further, the left-end fastening portion 35b comprises the front-side left-end fastening portion 35b f which is provided at the left-front end portion 3b f of the rear tunnel corresponding portion 31 and the rear-side left-end fastening portion 35*b* r which is provided at the left-rear end portion 3*b* r of the rear tunnel corresponding portion 31.

Thereby, the right floor frame 9*a* and the right tunnel side member 8*a* are connected via the rear auxiliary-device corresponding portion 32, and the pair of right-and-left tunnel side members 8*a*, 8*b* are connected via the rear tunnel corresponding portion 31.

Herein, as shown in FIGS. 7 and 8B, the rear underfloor member 3 is configured, similarly to the front underfloor member 2, such that the rear tunnel corresponding portion 31 together with the lower panel 34 and the upper panel 33, including the connection portion 3*cf* to the rear auxiliary-device corresponding portion 32, are offset upward relatively to the rear auxiliary-device corresponding portion 32 substantially by a plate thickness of the rear auxiliary-device corresponding portion 32, and a step portion 36*b* is formed at a right end of the connection portion 3*cf* (the front-side middle position 3*cf* of the rear underfloor member 3) of the rear tunnel corresponding portion 31 and the rear auxiliary-device portion 32 (see FIG. 7). Further, plural base portions 36*c* which protrude up to a level (height) of the upper face of the front tunnel portion 4*a* are provided a portion of the rear auxiliary-device corresponding portion 32 which corresponds to at least the right-end fastening portion 35*a*. Herein, a penetration hole 36*e* for insertion of the bolt B4 is formed at a central portion of one of the plural base portions 36*cs* which is provided at the right end portion 3*a*.

Accordingly, as shown in FIG. 8B, in a state where the rear underfloor member 3 is attached to the respective frames 9*a*, 8*a*, 8*b* provided below the floor panel 4 from below, the height (H1) of portions of an upper face of the rear underfloor member 3 which correspond to the right-end fastening portion 35*a*, the left-end fastening portion 35*b*, and the middle fastening portion 35*c* can be set to be higher than the height (H2) of the other portion in the vehicle width direction, similarly to the front underfloor member 2.

Moreover, since the concave central portion 31*e* (see FIG. 7) is formed at the upper face of the central portion, in the plan view, of the rear tunnel corresponding portion 31 of the rear underfloor member 3, the height (H2) of the rigidity center g at the central portion, in the vehicle width direction, of the rear tunnel corresponding portion 31 can be set to be lower accordingly.

Accordingly, the middle fastening portion 35*c* and the left-end fastening portion 35*b* at the both ends, in the vehicle width direction, of the rear tunnel corresponding portion 31 are respectively fastened to the right tunnel side member 8*a* and the left tunnel side member 8*b* at the level (H1) higher than the level (H2) of the rigidity center g (gravity) of the rear tunnel corresponding portion 31.

Thereby, even if the vehicle-side-collision load large enough to deform the rear underfloor member 3 itself is inputted to the rear underfloor member 3 from the vehicle-body rightward side, similarly to the case of the front underfloor member 2, the rear tunnel corresponding portion 31 which is configured to be deformed with priority, compared with the rear auxiliary-device corresponding portion 32, can be deformed so as to be bent downward surely (see the rear tunnel corresponding portion 31 shown by an imaginary line in FIG. 8B), thereby providing the similar effect to the front underfloor member 2. Moreover, since the concave central portion 31*e* is formed at the upper face of the central portion, in the plan view, of the rear tunnel corresponding portion 31 of the rear underfloor member 3, a vertical-directional space S1 formed below the tunnel portion 4*a* which is configured such that the height thereof becomes lower toward its rear side can be secured even in a case where the rear tunnel corresponding portion 31 is arranged below the tunnel portion 4*a* as shown in FIG. 4.

The lower vehicle-body structure of the automotive vehicle of the above-described present embodiment comprises the floor panel 4 which has the tunnel portion 4*a* which extends in the longitudinal direction at the center, in the vehicle width direction, of the vehicle, the pair of right-and-left floor frames 9*a*, 9*b* which are provided on the lower face of the floor panel 4 to interpose the tunnel portion 4*a* between them, and the pair of right-and-left tunnel side members 8*a*, 8*b* which extend along the tunnel portion 4*a* at the respective positions which are located on the outward side, in the vehicle width direction, of the tunnel portion 4*a* and on the inward side, in the vehicle width direction, of the floor frames 9*a*, 9*b*, wherein the power storage unit 40 as the auxiliary device is provided below the portion of the floor panel 4 which is positioned between the floor frame 9*a* and the tunnel side member 8*a*, the underfloor members 2, 3 (the front underfloor member 2 and the rear underfloor member 3) which extend in the vehicle width direction and straddle the right floor frame 9*a* where the power storage unit 40 is provided and the left tunnel side member 8*b* which is opposite to the side where the power storage unit 40 is provided are attached, and the yield strength of the vehicle width direction of the tunnel corresponding portions 21, 31, in the width direction, of the underfloor members 2, 3 which corresponds to the tunnel portion 4*a* are set to be lower than that of the auxiliary-device corresponding portions 22, 32, in the width direction, of the underfloor members 2, 3 which correspond to the power storage unit 40 (see FIGS. 1-3).

According to the above-described structure, even in a case where the vehicle-side-collision load from the vehicle-body right side where the power storage unit 40 is provided is applied to the floor frame 9*a* which is apart inward from the right side sill 5*a*, this collision load can be dispersed to the pair of right-and-left tunnel side members 8*a*, 8*b* provided on the both sides of the tunnel portion 4*a*. Further, even in a case where the vehicle-side-collision load large enough to deform the underfloor members 2, 3 is inputted from the vehicle-body right side, the tunnel corresponding portions 21, 31 which have the lower vehicle-width-directional yield strength than the auxiliary-device corresponding portions 22, 23 can be deformed with priority, thereby absorbing the collision load, and also the power-storage-unit arrangement space S can be secured by the auxiliary-device corresponding portions 22, 23.

Accordingly, the power-storage-unit arrangement space S can be secured surely even in the vehicle side collision. Moreover, since this power-storage-unit arrangement space S corresponds to an arrangement position, in the vehicle width direction, of a front seat 20, a survival space of a passenger can be secured.

In the embodiment of the present invention, the front underfloor member 2 is configured such that the front tunnel corresponding portion 21 and the front auxiliary-device corresponding portion 22 are integrated, and the front auxiliary-device corresponding portion 22 has the greater width, in the longitudinal direction, than the front tunnel corresponding portion 21 (see FIGS. 1 and 2).

According to the above-descried structure, the vehicle height can be prevented from being improperly low and also the productivity of the front underfloor member 2 and the covering performance of the power storage unit 40 can be improved.

Specifically, since the front underfloor member 2 is configured such that the front auxiliary-device corresponding portion 22 is wider, in the longitudinal direction, than the front tunnel corresponding portion 21 and extends in the vehicle width direction from the right floor frame 9a to the left tunnel side member 8b, the transmission and dispersion performances of the vehicle-side-collision load can be improved. Accordingly, compared with a case where the thick of the conventionally-exiting gusset which is laid only between the right floor frame 9a and the right tunnel side member 8a is made thicker in the vertical direction in order to secure the strength, for example, the thickness of the front underfloor member 2 can be properly thin, securing the strength, so that it can be prevented that the minimum ground clearance of the vehicle becomes improperly low.

Further, since the front auxiliary-device corresponding portion 21 can be thin with the sufficient strength, the workability of press forming or the like can be increased and thereby the productivity can be improved, compared with the conventionally-existing gusset which is configured to have a deep concave portion or a high convex portion at its upper or lower face for the sufficient strength.

Moreover, since the front auxiliary-device corresponding portion 22 can cover the power storage unit 40 over a wide range in the longitudinal direction, the protection performance (auxiliary-device covering performance) of the power storage unit 40 against chipping by flying stones during the vehicle traveling or the like can be improved.

Further, in the embodiment of the present invention, the rear tunnel corresponding portion 31 of the rear underfloor member 3 has the front-side constricted portion 38a which is configured such that the inward side, in the vehicle width direction, thereof has the narrower width, in the longitudinal direction, than the outward side, in the vehicle width direction, thereof, the rear auxiliary-device corresponding portion 32 of the rear underfloor member 3 is configured to substantially linearly extend along the vehicle width direction, and the rear underfloor member 3 is attached such that the rear auxiliary-device corresponding portion 32 is offset toward the constricted portion 38a of the rear tunnel corresponding portion 31 in the longitudinal direction (see FIGS. 2 and 3).

According to the above-described structure, when the vehicle has the side collision from the vehicle right side, the collision load can be received jointly by the rear auxiliary-device corresponding portion 32 and the rear tunnel corresponding portion 31 as described above. Further, when the large load is inputted, the rear tunnel corresponding portion 31 having the front-side constricted portion 38a can be deformed more preferentially than the rear auxiliary-device corresponding portion 32 when receiving the load from the rear auxiliary-device corresponding portion 32 configured to be offset forward, thereby absorbing the collision load and dispersing the collision load to the left tunnel side member 8b, and the power-storage-unit arrangement space S can be secured by the rear auxiliary-device corresponding portion 32.

That, is, by configuring that the rear tunnel corresponding portion 31 has at least one of the front-side constricted portion 38a and the rear-side constricted portion 38b, the rear tunnel corresponding portion 31 can be made weak and thereby be constricted in the vehicle width direction more preferentially than the rear auxiliary-device corresponding portion 32 in the right-side vehicle side collision, so that the rear tunnel corresponding portion 31 can be deformed downward, thereby absorbing the collision load.

Moreover, since the rear tunnel corresponding portion 31 can be made to be deformed more easily for the load input by configuring that the rear auxiliary-device corresponding portion 32 is connected so as to be offset, in the longitudinal direction, toward the front-side constricted portion 38a of the rear tunnel corresponding portion 31, this portion 31 is configured such that its yield strength can be low, without making its longitudinal-directional width smaller, its rigidity regarding the vehicle-body rigidity can be high, and its strength against the load input from the rear auxiliary-device corresponding portion 32 can be weak.

Also, in the present embodiment, since the rear tunnel corresponding portion 31 is supported at the tunnel side members 8a, 8b provided at the right-and-left both sides of the tunnel portion 4a from its both sides and formed in the butterfly shape in the bottom view, that is, configured to have at least the X-shaped convex portion 31a, the rigidity of the vehicle width direction of the tunnel portion 4a can be increased by the rear tunnel corresponding portion 31, thereby increasing the vehicle-body rigidity in the normal vehicle traveling.

Moreover, in the embodiment of the present invention, the power storage unit 40 is arranged on the right side of the tunnel portion 41 only, and the left end portions 2b, 3b of the front and rear underfloor members 2, 3 (the front underfloor member 2 and the rear underfloor member 3) are connected to the left tunnel side member 8b (see FIGS. 1 and 3).

According to the above-described structure, even in a case where the vehicle has the side collision from the left side which is opposite, relatively to the tunnel portion 4a, to the right side where the power-storage-unit arrangement space S is provided, the vehicle-side-collision load can be prevented from being transmitted to the power-storage-unit arrangement space S via the front and rear underfloor members 2, 3. Also, even in a case where the collision load is inputted from the vehicle left side and this load is transmitted to the front underfloor member 2 and/or the rear underfloor member 3, the tunnel corresponding portions 21, 31 of the front and rear underfloor members 2, 3 are deformed more preferentially than the auxiliary-device corresponding portions 22, 32 and thereby absorb the vehicle-side-collision load, thereby securing the power-storage-unit arrangement space S surely.

Further, as shown in FIGS. 1-4, in the present embodiment, the front tunnel corresponding portion 21 and the front tunnel cross member 100 are located at the same position in the longitudinal direction. Meanwhile, the outward portions, in the vehicle width direction, of the rear tunnel corresponding portion 31, that is, the front middle fastening portion 35cf and the front left-end fastening portion 35b f are located at the same position, in the longitudinal direction, as the rear tunnel cross member 101. Thereby, the rigidity of the vehicle width direction of the tunnel portion 4a is so increased that the vehicle-body rigidity in the normal state can be increased.

The front tunnel corresponding portion 21 is located at the same position, in the longitudinal direction, of the front tunnel cross member 100 which is positioned above the front tunnel corresponding portion 21, whereas the rear tunnel corresponding portion 31 is provided to be rearward offset from the rear tunnel cross member 101 which is positioned above the rear tunnel corresponding portion 31 according to its being rearward offset from the rear auxiliary-device corresponding portion 32 (see FIGS. 2 and 4). Herein, since the tunnel portion 4a is generally configured such that the height thereof becomes lower toward its rear side as shown in FIG. 4, the height of an inside (lower) space of the tunnel portion 4a becomes gradually lower.

According to the present embodiment, meanwhile, since the rear tunnel corresponding portion 31 is configured such that its X-shaped central portion is offset rearward from the rear tunnel cross member, as shown in FIG. 4, the rear underfloor member 3 is located at the higher level than the minimum ground clearance H of the vehicle, and also the vertical space S1 inside the tunnel portion 4a which is positioned at the rear side of the tunnel portion 4a is not narrowed by the rear tunnel corresponding portion 31 and the rear tunnel cross member 101 from upper, lower, left or right sides, so that the layout property of the inside of the low-height rear side of the tunnel portion 4a can be secured.

Moreover, in the present embodiment, the vehicle right side of a portion which corresponds to a position of the floor panel 4 having the power-storage-unit arrangement space S is located at the higher level than the vehicle left side of the above-described portion (Hr<Hl) (see FIG. 3). Thereby, the power-storage-unit arrangement space S can be secured.

Herein, it is preferable in securing a foot space for a passenger seated in a rear seat, not illustrated, that a structure where part of the floor panel 4 is located at the high level as described above be formed at a portion which is positioned in front of the foot space and corresponds to a seat cushion portion 200a of the front seat 200 among portions of the floor panel 4 which correspond to the power-storage-unit arrangement space S in the plan view.

There is a concern that the front and rear cross members 210, 211 which are provided on the upper-face side of the floor panel 4 and the vehicle right side (see FIGS. 3, 5A and 5B) becomes so thin that the rigidity against the vehicle-side collision may become low by locating part of the floor panel 4 at the high level as described above. According to the present embodiment, however, the vehicle body is reinforced by the front and rear underfloor members 2, 3 which are provided on the lower-face side of the floor panel 4 at the positions which correspond to, in the longitudinal direction, the front and rear cross members 210, 211, so that the rigidity against the vehicle-side-collision load can be secured.

As shown in FIGS. 5A and 5B, seat support brackets 212 (212a, 212b) are provided at both sides, in the vehicle width direction, of the rear cross member 211. Each of these seat support brackets 212a, 212b comprises a bracket upper portion 212U and a bracket lower portion 212D which is thinner than the bracket upper portion 212U, which are originally formed separately and joined together finally to form each of the box-shaped seat support brackets 212a, 212b.

It is preferable that the seat bracket 212a provided on the side of the side sill 5 (the outward-side seat support bracket 212a) be configured such that a cutout portion 213 is formed at front and rear wall portions of the bracket lower portion 212D as shown in FIG. 5A. This cutout portion 213 is configured such that a lower side portion of each wall portion of the bracket lower portion 212D, including its lower end portion, is cutoff from an outward end toward an inside.

By making the bracket lower portion 212D of the outward-side seat support bracket 212a thin and forming the cutout portion 213 at the bracket lower portion 212D as described above, the outward-side seat support bracket 212a itself can be made weak (the yield strength of the vehicle width direction can be made low). Thereby, the vehicle-side-collision load transmitted from the side sill 5a can be absorbed by the outward-side seat support bracket 212a being deformed, so that the vehicle-body deformation caused by the collision load can be kept up to the deformation of the outward-side seat support bracket 212a. Thus, the power-storage-unit arrangement space S which is positioned more inward, in the vehicle width direction, from the outward-side seat support bracket 212a can be protected from crushing.

Meanwhile, there is a concern that the seat support bracket 212 may not be able to secure the sufficient seat support rigidity in a case where its whole part is configured to be weak. In the present embodiment in which the bracket upper portion 212U is configured to have the thinner thick than the bracket lower portion 212D, however, the seat load can be received by the bracket upper portion 212U and dispersed to the bracket lower portion 212D efficiently, so that the seat support rigidity can be increased as a whole of the seat support bracket 212 with its light weight.

In correspondence between the present invention and the above-described embodiment, the auxiliary device of the present invention corresponds to the power storage unit 40 of the embodiment. Likewise, the member corresponds to the front underfloor member 2 or the rear underfloor member 3, the tunnel corresponding portion corresponds to the front tunnel corresponding portion 21 or the rear tunnel corresponding portion 31, the auxiliary-device corresponding portion corresponds to the front auxiliary-device corresponding portion 22 or the rear auxiliary-device corresponding portion 32, and the constricted portion corresponds to the front-side constricted portion 38a. However, the present invention should not be limited to the above-described embodiment.

For example, while the rear tunnel corresponding portion 31 of the present embodiment is configured in a central constricted shape such that it has the front-side constricted portion 38a and the rear-side constricted portion 38b, each of which is configured such that the inward side, in the vehicle width direction, thereof has the narrower width, in the longitudinal direction, than the outward side, in the vehicle width direction, thereof, the present invention is not limited to this but applicable to the rear tunnel corresponding portion having either one of the above-described constricted portions.

Further, the upper panel 33 of the rear tunnel corresponding portion 31 may have the X shape in the bottom view similarly to the lower panel 34 so that the rear tunnel corresponding portion 31 itself can provide the X-shaped contour in the bottom view. Thus, by configuring the rear tunnel corresponding portion 31 to have at least the X-shaped portion, the vehicle can be effectively restrained from being twisted during the vehicle's normal traveling.

Also, while the rear auxiliary-device corresponding portion 32 of the present embodiment is configured to have substantially the same longitudinal width as the front auxiliary-device corresponding portion 22, the present invention is not limited to this configuration, and the above-described longitudinal width may be set to be the same as or shorter than the longitudinal width of the pair of right-and-left linear convex portions 31c, 31d which constitute the X-shaped convex portion 31a of the rear tunnel corresponding portion 31, for example, as long as the yield strength of the vehicle width direction of the rear tunnel corresponding portion 31 is set to be smaller than that of the rear auxiliary-device corresponding portion 32.

Moreover, the present invention is not limited to the structure in which the front underfloor member 2 and the rear underfloor member 3 are provided below the floor panel 4, and either one of the underfloor members may be provided so as to cover the power storage unit 40 as the auxiliary device from below.

What is claimed is:

1. A lower vehicle-body structure of an automotive vehicle having an auxiliary device, comprising:
a floor panel having a tunnel portion which extends in a longitudinal direction at a center, in a vehicle width direction, of the vehicle;
a pair of right-and-left floor frames provided on a lower face of the floor panel to interpose the tunnel portion therebetween;
a pair of right-and-left tunnel side members extending along the tunnel portion at respective positions which are located on an outward side, in the vehicle width direction, of the tunnel portion and on an inward side, in the vehicle width direction, of the floor frames; and
a member which extends in the vehicle width direction and straddles one of the floor frames and the pair of right-and-left tunnel side members,
wherein the auxiliary device is provided below a portion of the floor panel which is positioned between the one of the floor frames and one of the tunnel side members,
the member includes a tunnel corresponding portion under the tunnel portion and an auxiliary-device corresponding portion under the auxiliary device, and
a first yield strength in the vehicle width direction of the tunnel corresponding portion of the member is set to be lower than a second yield strength in the vehicle width direction of the auxiliary-device corresponding portion of the member.

2. The lower vehicle-body structure of the automotive vehicle of claim 1, wherein the member is configured such that the tunnel corresponding portion and the auxiliary-device corresponding portion are integrated, and the auxiliary-device corresponding portion has a greater width, in the longitudinal direction, than the tunnel corresponding portion.

3. The lower vehicle-body structure of the automotive vehicle of claim 2, wherein the tunnel corresponding portion of the member has a constricted portion which is configured such that an inward side, in the vehicle width direction, thereof has a narrower width, in the longitudinal direction, than an outward side, in the vehicle width direction, thereof, the auxiliary-device corresponding portion of the member is configured to substantially linearly extend along the vehicle width direction, and the member is attached such that the auxiliary-device corresponding portion is offset toward the constricted portion of the tunnel corresponding portion in the longitudinal direction.

4. The lower vehicle-body structure of the automotive vehicle of claim 3, wherein the auxiliary device is provided on either a right side or a left side of the tunnel portion, and an end portion of the member is connected to another of the tunnel side members.

5. The lower vehicle-body structure of the automotive vehicle of claim 2, wherein the auxiliary device is provided on either a right side or a left side of the tunnel portion, and an end portion of the member is connected to another of the tunnel side members.

6. The lower vehicle-body structure of the automotive vehicle of claim 1, wherein the tunnel corresponding portion of the member has a constricted portion which is configured such that an inward side, in the vehicle width direction, thereof has a narrower width, in the longitudinal direction, than an outward side, in the vehicle width direction, thereof, the auxiliary-device corresponding portion of the member is configured to substantially linearly extend along the vehicle width direction, and the member is attached such that the auxiliary-device corresponding portion is offset toward the constricted portion of the tunnel corresponding portion in the longitudinal direction.

7. The lower vehicle-body structure of the automotive vehicle of claim 1, wherein the auxiliary device is provided on either a right side or a left side of the tunnel portion, and an end portion of the member is connected to another of the tunnel side members.

8. A lower vehicle-body structure of an automotive vehicle having an auxiliary device, comprising:
a floor panel having a tunnel portion which extends in a longitudinal direction at a center, in a vehicle width direction, of the vehicle;
a pair of right-and-left floor frames provided on a lower face of the floor panel to interpose the tunnel portion therebetween;
a pair of right-and-left tunnel side members extending along the tunnel portion at respective positions which are located on an outward side, in the vehicle width direction, of the tunnel portion and on an inward side, in the vehicle width direction, of the floor frames; and
a member which extends in the vehicle width direction and straddles one of the floor frames and the pair of right-and-left tunnel side members,
wherein the auxiliary device is provided below a portion of the floor panel which is positioned between the one of the floor frames and one of the tunnel side members,
the member includes a tunnel corresponding portion under the tunnel portion and an auxiliary-device corresponding portion under the auxiliary device,
a first yield strength in the vehicle width direction of the tunnel corresponding portion of the member is set to be lower than a second yield strength in the vehicle width direction of the auxiliary-device corresponding portion of the member,
the member is configured such that the tunnel corresponding portion and the auxiliary-device corresponding portion are integrated, and the auxiliary-device corresponding portion has a greater width, in the longitudinal direction, than the tunnel corresponding portion,
the tunnel corresponding portion of the member has a constricted portion which is configured such that an inward side, in the vehicle width direction, thereof has a narrower width, in the longitudinal direction, than an outward side, in the vehicle width direction, thereof, the auxiliary-device corresponding portion of the member is configured to substantially linearly extend along the vehicle width direction, and the member is attached such that the auxiliary-device corresponding portion is offset toward the constricted portion of the tunnel corresponding portion in the longitudinal direction, and
the auxiliary device is provided on either a right side or a left side of the tunnel portion, and an end portion of the member is connected to another of the tunnel side members.

* * * * *